March 11, 1947.  R. O. SCHMITT  2,417,131
DISTILLATION OF POLYHYDRIC CONCENTRATE WITH COOLING OF SOLID RESIDUE
Filed Dec. 5, 1944

INVENTOR.
Robert O. Schmitt
BY Arthur Robert
Atty

Patented Mar. 11, 1947

2,417,131

UNITED STATES PATENT OFFICE 2,417,131

DISTILLATION OF POLYHYDRIC CONCENTRATE WITH COOLING OF SOLID RESIDUE

Robert O. Schmitt, Louisville, Ky., assignor to Joseph E. Seagram & Sons, Inc., Shively, Ky., a corporation of Indiana Application December 5, 1944, Serial No. 566,758

7 Claims. (Cl. 202—70)

1

In the manufacture of 2,3 butylene glycol, a beer, containing the glycol, is produced by fermenting an acid hydrolized grain in a water solution and then concentrated to a syrup containing approximately 7.5% butylene glycol and 20 to 30% of both suspended and dissolved solids which comprise unfermented grain and inorganic salts. To recover the glycol from the syrup, processes of the character disclosed in U. S. Patents 2,151,990 and 2,315,422–23 may be employed wherein the syrup is fed to a non-boiling bath of kerosene or equivalent liquid having a temperature capable of causing the glycol to flash distill and being substantially immiscible with glycol and water and incapable of dissolving the solids which are of higher specific gravity than the bath. As a consequence, when the syrup is fed into the bath, the water and glycol flash off immediately and completely while the solids, because of their relatively higher specific gravity, settle to the bottom. The removal of the solids, however, presents a problem since they tend to agglomerate and stick to metal surfaces while remaining in the hot oil.

The present invention relates to the removal of the solids in a system of this character and has for its principal object a simple and inexpensive method of, and means for, avoiding agglomeration and sticking of the solids and thereby enabling the removal to be effected without difficulty.

Another object is to provide an arrangement which permits the solids to be either recovered or wasted without appreciable loss of oil.

Figure 1:
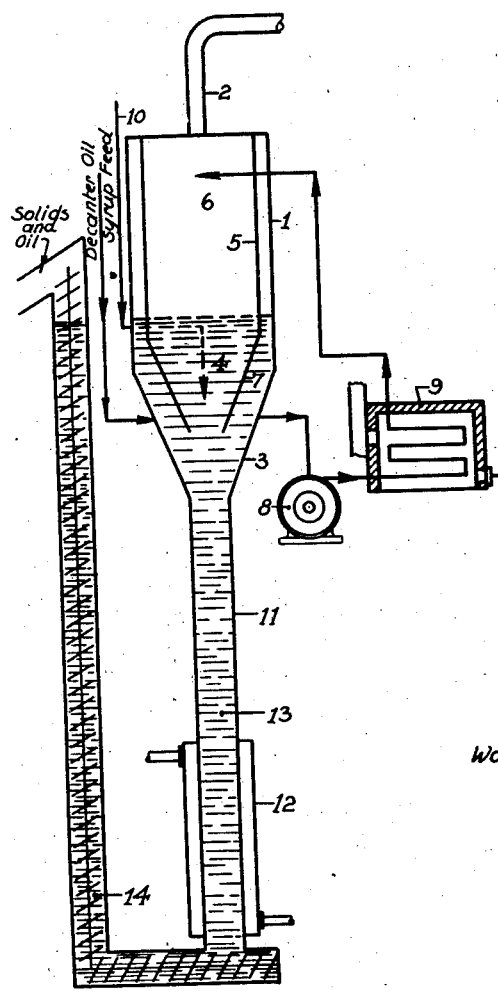
Figure 2:
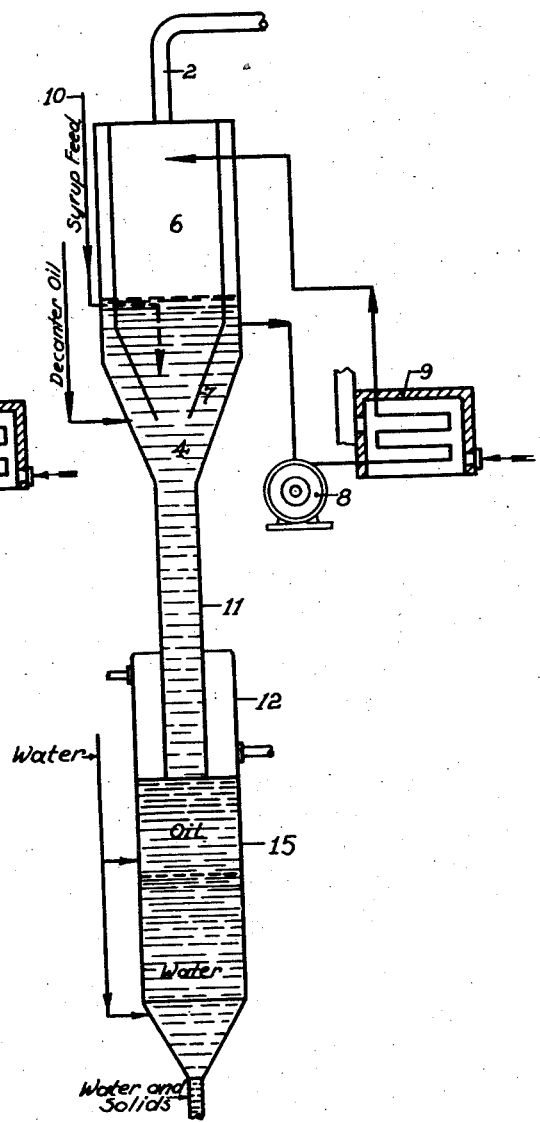

The invention is illustrated in the accompanying drawing wherein:

Figure 1 discloses an apparatus embodying the invention which permits the recovery of the solids; and Figure 2 discloses a slight modified form of apparatus which permits the solids to be wasted to a sewer.

The apparatus shown in Figure 1 conventionally includes: a flash distillation still having a housing 1, a vapor outlet 2 at its top, a conical bottom 3, an oil bath 4 and an inner cylinder 5 surrounding a flash distillation chamber 6 between the top of the bath and the vapor outlet 2, and having an open conical bottom 7 submerged in the bath; means for maintaining the non-boiling flash distilling temperature of the oil bath comprising a pump 8 for withdrawing hot bath liquid and forcing it through a heater 9 back into the flash distillation chamber 6; and a syrup feed 10 which discharges syrup at a submerged

2 point within that portion of the bath which is contained within the conical bottom of the inner cylinder 5.

With this arrangement, the syrup, upon being discharged into the oil bath, is subjected to flash distillation causing glycol and water vapors to pass upwardly through the flash distillation chamber 6 and through the vapor outlet 2 into the glycol recovery apparatus which is not shown. At the same time the solids settle passing through the bottom opening of the inner conical member 7 and being assisted in this movement by the circulation of oil downwardly through the conical bottom 7 of cylinder 5, and through pump 8 and heater 9 back to the distillation chamber 6 within the upper part of cylinder 5. The removal of the solids from the hot kerosene bath has heretofore presented a problem.

In accordance with my invention the problem of removing the solids is overcome by elongating the bath vertically to a degree such that its upper portion can be maintained at the desired high flash distilling temperature, while its lower portion can be maintained below a non-plastic or non-sticky temperature, that is to say, a temperature sufficiently low to cause the solids to lose their plastic and adhesive properties which occasion sticking and agglomeration. In other words, I propose to provide a tall oil bath having an upper portion and a lower portion, to maintain the upper portion at the hot distilling temperature, to maintain the lower portion at a temperature at which the materials will not be plastic or sticky and to feed syrup into the hot upper portion of the bath while allowing the solids to settle downwardly into the cool lower portion of the bath.

The invention can be carried out simply by extending the conical bottom 3 downwardly in the form of a leg 11, the lower half of which is provided with a cooling jacket 12 for maintaining the lower portion 13 of the bath preferably at or slightly above room temperature. The temperature in the lower half may be at any value at which the materials will not be plastic or sticky which will vary with different polyhydric materials. With 2,3 butylene glycol, temperatures of 200° F. appear practical. The length of the cool leg need not be over 4 or 5 feet, but its diameter should be such as to permit the solids to fall by gravity without plugging up. A 9 to 4 ratio, between the diameter of the housing 1 and the cool leg 11, is recommended although higher ratios, as much as 9 to 1 and 12 to 1, have been successfully employed.

Where it is desired to recover the solids as a food by product, a rising conveyor 14 can be employed to discharge the solids from the cool leg, with a small quantity of adhering oil, at a level above the upper level of the bath as a whole. The adhering oil may be removed, and the feed product recovered, by steam stripping the solids in any desired and well known manner.

Where the solids are to be wasted to a sewer, a water interface can be maintained at the lower end of the cool leg as shown in Figure 2. Here the lower end of the cool leg 11, is enlarged at 15 to provide a chamber containing oil in its upper part and water in its lower part. The oil temperature here should be below the boiling point of the water. The enlarged chamber reduces turbulence in the liquid and correspondingly avoids interference with the settling action. The solids settle by gravity through the oil and enter the water phase. These solids can be continuously discharged to the sewer by running a continuous stream of water into the water phase and, at the same time, discharging a mixture of water and solids from the bottom thereof, at rates such that a constant interface level is maintained. Some water may be introduced above the water level to produce a flow of water through the oil in chamber 15 and thereby facilitate the settling of solids into the water. Here again, the length of the cool leg need not be over 4 or 5 feet of operation under atmospheric pressure. However, for vacuum operation it is necessary to have the length of the evaporator and the leg at such a value that it is possible to discharge from the base of the leg into atmosphere. The diameter of the leg 11 should be as before although the diameter of the interface chamber 15 is preferably larger than that of the leg to minimize turbulence as stated above.

It will be appreciated that the invention is applicable to other polyhydric organic compounds produced from grain such as glycerine, ethylene glycol, propylene glycol and 1,3 butylene glycol.

Having described my invention, I claim:

1. An improvement in the method of separating the liquid and solid phases of concentrates having polyhydric organic compounds in liquid phase and solids which become plastic and sticky when sufficiently heated wherein the concentrate is fed to a non-boiling bath of hot liquid, such as oil, having a temperature causing the concentrate liquids to flash distill and the property of being substantially immiscible with the concentrate liquids and having a specific gravity causing the concentrate solids to settle and the property of being incapable of appreciably dissolving the solids comprising: feeding the concentrate to the upper portion of a tall bath of the said bath liquid; and maintaining the upper portion of said bath at the flash distilling temperature and the lower portion of said bath at a temperature below that at which the solids become sticky, plastic and tend to agglomerate.

2. A method of separating the liquid and solid phases of concentrates having polyhydric organic compounds in liquid phase and solids which become plastic and sticky when sufficiently heated comprising: feeding the concentrate to the upper portion of a tall bath of liquid which is substantially immiscible with the concentrate liquids and which not only has a smaller specific gravity than the concentrate solids but is incapable of appreciably dissolving such solids; maintaining the upper portion of said bath at an elevated non-boiling temperature high enough to render the solids plastic and to flash distill the concentrate liquids from the solids and the bath, the solids settling by gravity into the lower portion of the bath; and maintaining the lower portion of said bath at a temperature sufficiently low to cause the settling solids to revert to a non-plastic and non-sticky condition.

3. The method of claim 2 wherein the polyhydric compound is 2,3 butylene glycol.

4. The method of claim 2 wherein the solids are removed from the cool portion of the bath.

5. The method of claim 2 including the following steps: removing the solids directly from the oil bath; and separating the removed solids from the adhering oil.

6. The method of claim 2 including the following steps: maintaining a water bath at the lower end of the cool oil bath to receive solids settling downwardly through the oil bath; and discharging water and solids from the water bath.

7. An apparatus for separating the liquid and solid phases of concentrates having polyhydric organic compounds in liquid phase and solids which become plastic and sticky when sufficiently heated comprising: a distillation vessel having a vertically elongate chamber for receiving a bath of oil; a bath of oil in said chamber, the oil having a boiling temperature substantially above the flash distilling temperature of the concentrate liquids and a specific gravity substantially lower than the concentrate solids and being substantially immiscible with the concentrate liquids and incapable of appreciably dissolving the solids; means for feeding the concentrate into the upper portion of said bath; means for maintaining the upper portion of said bath at an elevated non-boiling temperature high enough to render the solids plastic and to flash distill the concentrate liquids from the solids and the bath, the solids settling by gravity into the lower portion of the bath; and means to maintain the lower portion of the bath at a temperature sufficiently low to cause the settling solids to revert to a non-plastic and non-sticky condition.

ROBERT OTTO SCHMITT.

REFERENCES CITED

The following references are of record in the file of this patent:

UNITED STATES PATENTS

| Number | Name | Date |
|---|---|---|
| 1,547,893 | Bergius | July 28, 1925 |
| 2,151,990 | Ruys | Mar. 28, 1939 |
| 2,315,422 | Hildebrandt | Mar. 30, 1943 |